June 13, 1933.  A. L. D. D'ADRIAN  1,913,703
MEANS FOR PREVENTING SWEATING OF GLASS OF REFRIGERATING CASES
Filed May 21, 1932

INVENTOR
A. L. DUVAL D'ADRIAN
By J. S. Cook
ATTORNEY

Patented June 13, 1933

1,913,703

UNITED STATES PATENT OFFICE

ALEXANDER L. DUVAL D'ADRIAN, OF ALTON, ILLINOIS, ASSIGNOR TO HUSSMANN-LIGONIER COMPANY, OF ST. LOUIS, MISSOURI, A CORPORATION OF DELAWARE

MEANS FOR PREVENTING SWEATING OF GLASS OF REFRIGERATING CASES

Application filed May 21, 1932. Serial No. 612,673.

This invention relates generally to a means for preventing sweating of glass of refrigerating cases and the like, and more specifically to an improved method and means of this sort which is of an extremely simple nature and functions with a high degree of efficiency, the predominant object of the invention being to provide a method and means for eliminating fogging of the glass portions of refrigerating cases and like equipment, and thus maintain the maximum visibility through said glass portions.

Sweating (so called) of glass portions of refrigerating cases is caused by humidity contained in the atmosphere adjacent to said glass portions being deposited by condensation on the cold surfaces of the glass portions, and to prevent this the present invention contemplates the absorption of the humidity from said atmosphere so as to prevent such deposition thereof on the glass portions of the refrigerating cases. In carrying out the invention I employ a hydroscopic material, preferably silica gel, a body of which is by preference arranged in a suitable container disposed at the space between a pair of spaced sections of glass. Silica gel will absorb a certain amount of moisture, and after this amount of absorption has been reached absorption of moisture by the said silica gel will be practically arrested. I therefore employ a suitable heating device as a part of my invention which is operable to heat the silica gel to a high enough temperature to evaporate the moisture previously absorbed by said silica gel, and in this manner render the silica gel capable of again acting as an efficient moisture absorbent. The structure of the invention is such that vapor produced by evaporation of the moisture absorbed by the silica gel is discharged outside of the refrigerating case and remote from the glass portions thereof, so as to avoid discharging said vapor at points where it may tend to fog the glass portions. Also, the invention includes automatic means for turning on and discontinuing operation of the heating device so that said heating device will be operated only at the proper time.

Figure 1:
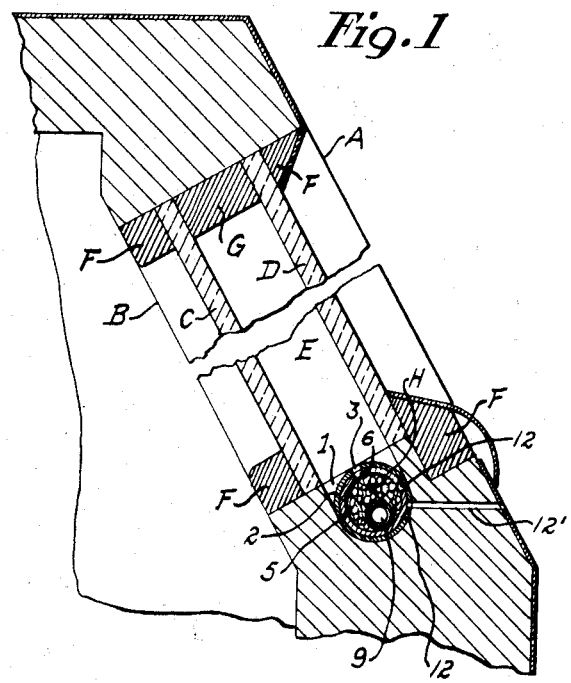
Fig. 1 is a fragmentary sectional view of the front portion of a refrigerating case equipped with the invention disclosed herein.
Figure 2:
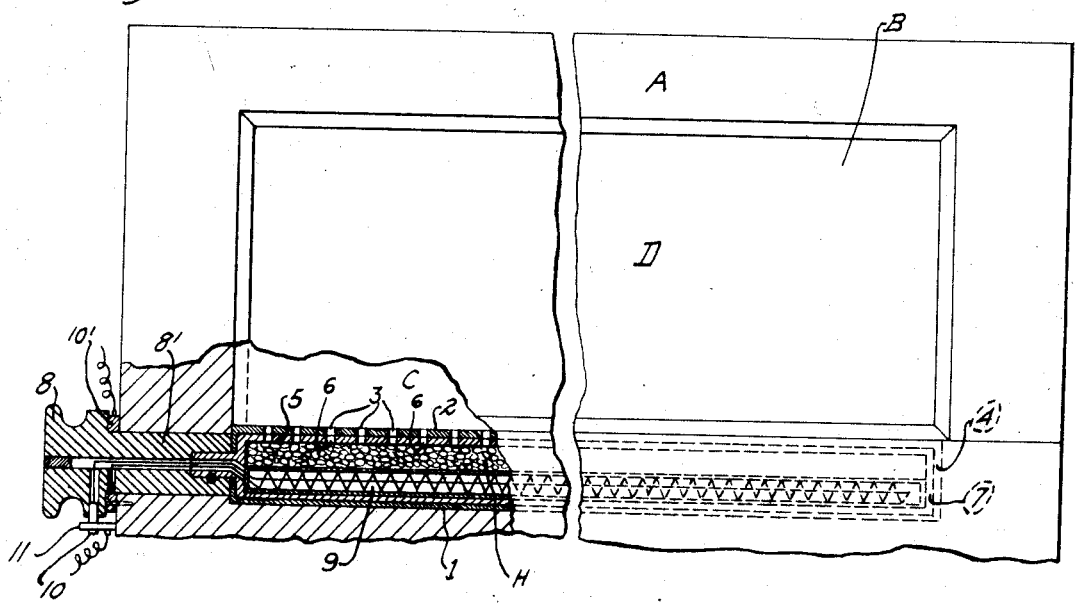
Fig. 2 is a fragmentary front elevation of the refrigerating case illustrated in Fig. 1, portions thereof being broken away to show the interior construction and arrangement thereof.
Figure 3:
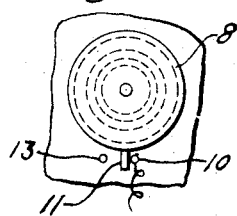
Fig. 3 is a fragmentary end elevation of the refrigerating case shown in Figs. 1 and 2.

In the drawing, where is shown for the purpose of illustration, merely, one embodiment of the invention, A designates the front portion of a refrigerating case which is provided with a transparent wall portion B produced by a pair of sections of glass C and D which are spaced apart with respect to each other to provide a space E therebetween. The sections of glass C and D are maintained in the proper positions with respect to the front wall of the refrigerating case by suitable elements F, and the spaced relation of said sections of glass is maintained by suitable means G.

Formed in the wall structure of the refrigerating case A at the bottom of the space E between the sections of glass C and D is a recess 1, which extends longitudinally of said space from end to end thereof. The recess 1 is of curved or other suitable formation, and disposed in said recess is an elongated tube 2 which is provided at its upper portion with a number of perforations 3, said tube being maintained in a fixed position in said recess. The perforations 3 place the space E in communication with the interior of the tube 2, and the right-hand end of said tube, as illustrated in Fig. 1, is closed by a wall portion 4.

Arranged within the tube 2 is a similar tube 5 of the necessary reduced diameter, said tube 5 likewise being provided with a number of perforations 6 formed through the upper portion of the wall thereof and being closed at one end by a wall portion 7. At the end thereof opposite to the end at which the wall portion 7 is located the inner tube 5 is provided with a knob 8 which facilitates rotation of said inner tube with respect to the outer tube 2 in order to move the perforations of the inner tube into and out of registration with respect to the perforations of the outer tube. The knob 8 includes a shank portion 8′ which is extended through an opening formed through the wall of the refrigerating case A, so that said knob is located outside of the refrigerating case.

Disposed within the inner tube 5 is a suitable heating device 9 which preferably, though not necessarily, is electrically operated. The particular heating device illustrated in the drawing comprises an elongated tubular element within which suitable electrical resistance element is arranged, said tubular element being extended substantially throughout the length of the inner tube 5. The opposite ends of the electrical resistance element of the heating device are electrically connected to a fixed contact element 10′, located at an outer face of the refrigerating case A, and a similar contact element 11 fixed to and movable with the knob 8. The contact element 10′ and a contact element 10 which is fixed to an adjacent face of the refrigerating case A are electrically connected to a suitable source of electrical energy, and because of this arrangement the resistance element of the heating device may be energized or deenergized by rotating the knob 8 to move the contact element 11 into or out of contact with the contact element 10. The knob 8 is, of course, suitably insulated (not shown) so as to avoid electrical shock to a person touching the same.

Arranged within the inner tube 5 is a body of dry hydroscopic material H which preferably may be silica gel, although other dry hydroscopic materials, such for instance as calcium chloride, may be used. The hydroscopic material is disposed within the inner tube 5 in close proximity to the heating device 9, so that heat generated by said heating device will serve to dry out said hydroscopic material after it has absorbed moisture. The outer tube 2 and the inner tube 5 are provided with outlet passageways 12 through which vapor produced when the heating device is placed in operation for the purpose of evaporating moisture from the hydroscopic material escapes. The outlet passageways 12 are in registration with each other when the absorption apertures of the outer and inner tubes are closed and the heating device is in operation, and said outlet passageways are offset with respect to each other so as to be closed when the absorption apertures of the outer and inner tubes are in registration and open. When the outlet passageways 12 are in registration and open they communicate with a discharge opening 12′ formed in the adjacent wall of the refrigerating case.

In the operation of the invention, the inner tube 5 is so arranged that the perforations 6 thereof register with the perforations 3 of the outer tube 2 and therefore the hydroscopic material H is exposed to the atmosphere in the space E between the sections of glass C and D. The result of this is that humidity in said atmosphere will be absorbed by said hydroscopic material. As already stated herein, dry hydroscopic materials of the type which I employ in carrying out my invention will absorb a certain amount of moisture, and after this absorption has taken place absorption of moisture by the hydroscopic material will practically cease. When, in the use of my invention, absorption of moisture by the hydroscopic material ceases as described, the knob 8 will be rotated a portion of a revolution with the result that the perforation of the inner tube 5 will be moved out of registration with respect to the perforations of the outer tube 2. Also, such rotation of the knob 8 will move the electrical contact element 11 into contact with the electrical contact element 10 whereby the electrical resistance element of the heating device will be energized and heat will be produced thereby. The production of heat by the heating device will dry out the hydroscopic material H, the moisture therein being evaporated and passing in the form of vapor through the outlet passageways 12 and discharge opening 12′ to the outside of the refrigerating case. It is apparent that the vapor produced when heat is applied to the hydroscopic material may not pass into the space E between the sections of glass C and D, due to the fact that the perforations 3 and 6 of the outer and inner tubes are out of registration with each other, but instead all of said vapor is discharged outside of the refrigerating case and away from the sections of glass C and D through the outlet passageways 12 and discharge opening 12′. Also, it is plain that because one of the electrical contact elements which controls passage of current to the heating device 9 is movable with the knob 8 which controls registration and nonregistration of the perforations of the outer and inner tubes 2 and 5, said heating device is placed in operation only when the perforations of said tubes are out of registration with respect to each other. Because of this arrangement, there is no danger that the heating device will be accidentally placed in operation when the perforations of the outer and inner tubes are positioned so that vapor would be discharged into the space E between the sections of glass C and D.

The outlet passageway 12 of the outer tube 2 is movable into and out of effective discharge relation with respect to the outlet passageway 12 of the inner tube 5, said outlet passageways being offset and closed when the apertures 3 and 6 are in registration and the heating device is not in operation, and in registration or open so as to discharge vapor when said heating device is being operated to evaporate moisture from the hydroscopic material. To properly limit rotative movement of the inner tube 5 with respect to the outer tube 2 a suitable stop element 13 is employed, this stop element limiting movement of the inner tube in one direction and the contact element 10 limiting movement of said inner tube in the opposite direction due to contact therewith of the contact element 11.

It is to be understood that I do not limit myself to the use of any particular hydroscopic material, as any such material which may be dried out by subjection thereof to heat may be employed. Also, while I describe and claim the invention as being particularly applicable to refrigerating units having glass sections, it is to be understood that said invention may be used with other structures which are not refrigerating units, and transparent material other than glass may be used as parts of refrigerating cases or such other structures with which my invention is associated.

I claim:

1. In combination with a refrigerating case having a transparent wall portion provided by spaced sections of glass, a container disposed at the space between said sections of glass, a body of moisture-absorbent material in said container, and heating means for applying heat to said moisture-absorbent material so as to evaporate the moisture absorbed by said moisture-absorbent material, said container being arranged so as to discharge vapor resulting from the evaporation of moisture from said absorbent material outside of the space between said spaced sections of glass.

2. In combination with a refrigerating case having a transparent wall portion provided by spaced sections of glass, a container disposed at the space between said sections of glass, a body of moisture-absorbent material in said container, said container being provided with apertures through which said absorbent material is exposed to the atmosphere between said sections of glass and including means whereby said apertures may be rendered open or closed, and heating means for applying heat to said moisture-absorbent material so as to evaporate the moisture absorbed by said moisture-absorbent material, said container being provided with a discharge opening for vapor located outside of said space between said sections of glass.

3. In combination with a refrigerating case having a transparent wall portion provided by spaced sections of glass, a container disposed at the space between said sections of glass, said container having a portion which is movable with respect to another portion thereof, a body of moisture-absorbent material in said container, said container being provided with apertures through which said absorbent material is exposed to the atmosphere between said sections of glass which are capable of being rendered open or closed on movement of said movable portion of said container, and heating means for applying heat to said moisture-absorbent material so as to evaporate the moisture absorbed by said moisture-absorbent material, said container being provided with a discharge opening for vapor located outside of said space between said sections of glass, said discharge opening being controlled by movement of said movable portion of said container in a manner to be open when the apertures of said container are closed and closed when said apertures are open.

4. In combination with a refrigerating case having a transparent wall portion provided by spaced sections of glass, a container disposed at the space between said sections of glass, a body of moisture-absorbent material in said container, said container being provided with apertures through which said absorbent material is exposed to the atmosphere between said sections of glass and including means whereby said apertures may be rendered open or closed, heating means for applying heat to said moisture-absorbent material so as to evaporate the moisture absorbed by said moisture-absorbent material, said container being provided with a discharge opening for vapor located outside of said space between said sections of glass, and means for controlling operation of said heating means.

5. In combination with a refrigerating case having a transparent wall portion provided by spaced sections of glass, a container disposed at the space between said sections of glass, a body of moisture-absorbent material in said container, said container being provided with apertures through which said absorbent material is exposed to the atmosphere between said sections of glass and including means whereby said apertures may be rendered open or closed, electrical heating means for applying heat to said moisture-absorbent material so as to evaporate the moisture absorbed by said moisture-absorbent material, said container being provided with a discharge opening for vapor located outside of said space between said sections of glass, and electrical means for controlling operation of said heating means.

In testimony that I claim the foregoing I hereunto affix my signature.

ALEXANDER L. DUVAL D'ADRIAN